(12) United States Patent
McClure et al.

(10) Patent No.: US 9,192,101 B2
(45) Date of Patent: Nov. 24, 2015

(54) PICK-UP TINE BRACKET WITH FLANGE

(75) Inventors: John R. McClure, New Holland, PA (US); Singh Chandrashekhar, Lancaster, PA (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 13/489,809

(22) Filed: Jun. 6, 2012

(65) Prior Publication Data
US 2013/0327009 A1 Dec. 12, 2013

(51) Int. Cl.
*A01D 89/00* (2006.01)
*A01D 80/02* (2006.01)

(52) U.S. Cl.
CPC .............. *A01D 80/02* (2013.01); *A01D 89/002* (2013.01)

(58) Field of Classification Search
CPC ....................................................... A01D 80/02
USPC ............... 56/14.3, 14.4, 16.4, 17.3, 364, 400, 56/400.21; 172/643, 707
See application file for complete search history.

(56) References Cited

U.S. PATENT DOCUMENTS

| | | | | |
|---|---|---|---|---|
| 2,171,025 A | | 8/1939 | Crumb et al. | |
| 2,432,653 A | * | 12/1947 | Bloom | 56/400 |
| 2,514,560 A | | 7/1950 | Scranton | |
| 2,607,182 A | * | 8/1952 | Hill | 56/400 |
| 2,607,183 A | * | 8/1952 | Happe et al. | 56/400 |
| 2,657,521 A | * | 11/1953 | Happe | 56/400 |
| 2,714,796 A | * | 8/1955 | Haupt et al. | 56/400 |
| 2,856,748 A | | 10/1958 | Keene | |
| 2,987,866 A | | 6/1961 | Ferris | |
| 2,987,867 A | | 6/1961 | Nicholson | |
| 3,014,335 A | * | 12/1961 | Nolt | 56/400 |
| 3,175,347 A | | 3/1965 | Scheidenhelm | |
| 3,183,653 A | | 5/1965 | Cromwell | |
| 3,394,537 A | | 7/1968 | Keene | |
| 3,664,107 A | * | 5/1972 | Keller | 56/400 |
| 4,297,833 A | | 11/1981 | Gaeddert | |
| 4,342,366 A | * | 8/1982 | Schenk et al. | 172/643 |
| 4,423,787 A | | 1/1984 | Steinberg | |
| 4,512,146 A | | 4/1985 | Klinner | |
| 4,589,497 A | * | 5/1986 | Kovar | 172/707 |
| 8,051,636 B2 | * | 11/2011 | McClure et al. | 56/364 |

FOREIGN PATENT DOCUMENTS

| | | |
|---|---|---|
| AT | 0006306 U1 | 8/2003 |
| DE | 2442355 A1 | 8/1974 |
| DE | 3914482 A1 | 11/1989 |
| EP | 2384616 | 11/2011 |

* cited by examiner

*Primary Examiner* — Thomas B Will
*Assistant Examiner* — Mai Nguyen
(74) *Attorney, Agent, or Firm* — Patrick M. Sheldrake; Seyed V. Sharifi T.

(57) ABSTRACT

A tine mounting bracket for connecting tines to tine bars on an agricultural pick-up reel. The tines include a coiled spring section at the base of the tine and adjacent to the tine bar connection. The improved mounting bracket includes a flange that extends in adjacent contact with a portion of the coiled spring section and inhibits lateral deflection of the tine spring.

13 Claims, 2 Drawing Sheets

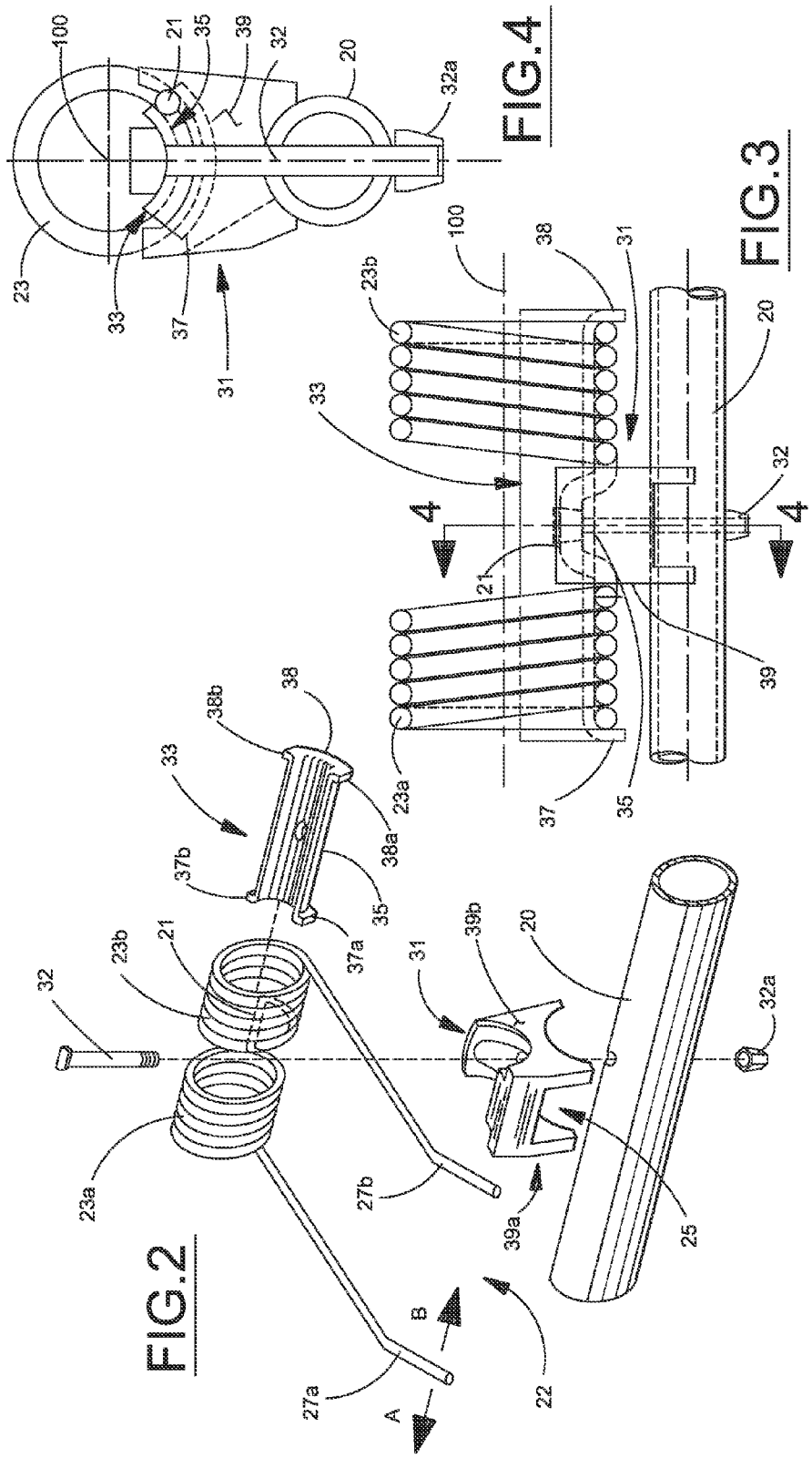

PICK-UP TINE BRACKET WITH FLANGE

BACKGROUND OF THE INVENTION

This invention relates generally to an agricultural pickup assembly having tines passing within tine guards and, more particularly, to a pickup tine mounting bracket with a flange.

Pick-up assemblies used in agricultural harvesting machines typically include a reel that is rotatable about a horizontal central axis. The reel comprises a plurality of parallel tine bars arranged for movement in a generally circular path around the central axis. Individual tines are connected to the bars and extend generally radially outwardly to lift crop material from the ground and convey it into a crop processing mechanism. The tine bars are connected to a central shaft by end plates, and as the reel rotates, the tines project through spaces or gaps formed between tine guards arranged side-by-side transversely of the reel. These tine guards are individually secured at their top and bottom ends to support members on the pickup.

Tines typically include a coiled spring portion adjacent to their mounting on the tine bar to allow the tine to flex upon contact with an immoveable object rather than breaking the tine. These springs ideally allow fore-aft tine movement. The tines may experience significant lateral loads during operation which causes spring deflection and may allow detrimental tine contact with the tine guards. Stiffening the springs sufficiently to withstand lateral loads without excessive deflection results in spring stiffness that is greater than necessary for the anticipated fore-aft loadings. Increased wire size, a common way to stiffen the springs, decreases tine fore-aft deflection cycle life (the primary tine movement orientation). Larger wire also requires greater lateral space for the tines which could require significant alteration of the pick-up assembly and is thus often impractical.

It would be advantageous to provide a modified mounting bracket for mounting tines to a tine bar that reinforces the tine spring coils to reduce lateral tine deflection without increasing the spring stiffness in the longitudinal (fore-aft) direction. Additional advantages would be realized by a modified tine mounting bracket that allows connection of exiting tine configurations to existing tine bar configurations with little or no modification of either. Still further advantages would be realized if the modified tine mounting bracket can be produced more economically than modifying the tine spring coil to accomplish the same objective.

SUMMARY OF THE INVENTION

Accordingly, the present invention, in any of the embodiments described herein, may provide one or more of the following advantages:

It is an object of the present invention to provide an improved tine mounting bracket for a pick-up reel that increases lateral tine stiffness.

It is a further object of the present invention to provide an improved tine mounting bracket for a pick-up reel that increases lateral tine stiffness without affecting the longitudinal tine stiffness or requiring alteration of the tine spring, either through increased diameter spring wire or variation in the spring coil configuration.

It is a further object of the present invention to provide an improved tine mounting bracket for a pick-up reel that is suitably robust for application in an agricultural pick-up reel.

It is a further object of the present invention to provide an improved tine mounting bracket for a pick-up reel that is compatible with existing tine and tine bar configurations and may be used without altering the tine or tine bar design.

It is a further object of the present invention to provide and improved tine mounting bracket for a pick-up reel that provides lateral restraint of tine springs to reduce tine finger deflection in both lateral directions.

It is a still further object of the present invention to provide an improved tine mounting bracket for a pick-up reel that enables tines to be easily installed on a tine bar.

It is a still further object of the present invention to provide an improved tine mounting bracket for a pick-up reel that is durable in construction, inexpensive of manufacture, carefree of maintenance, easily assembled, and simple and effective to use.

These and other objects are achieved in accordance with the present invention by providing a tine mounting bracket for connecting tines to tine bars on an agricultural pick-up reel. The tines include a coiled spring section at the base of the tine and adjacent to the tine bar connection. The improved mounting bracket includes a flange that extends in adjacent contact with a portion of the coiled spring section and inhibits lateral deflection of the tine spring.

BRIEF DESCRIPTION OF THE DRAWINGS

The advantages of this invention will be apparent upon consideration of the following detailed disclosure of the invention, especially when taken in conjunction with the accompanying drawings wherein:

FIG. 2 is a detail view of a tine connection to a tine bar of the tine reel of FIG. 1;

FIG. 3 is an elevation view of the tine connection shown in FIG. 2; and

FIG. 4 is a section view of the tine connection of FIG. 3 taking along cut line 4-4.

DESCRIPTION OF THE PREFERRED EMBODIMENT(S)

Figure 1:
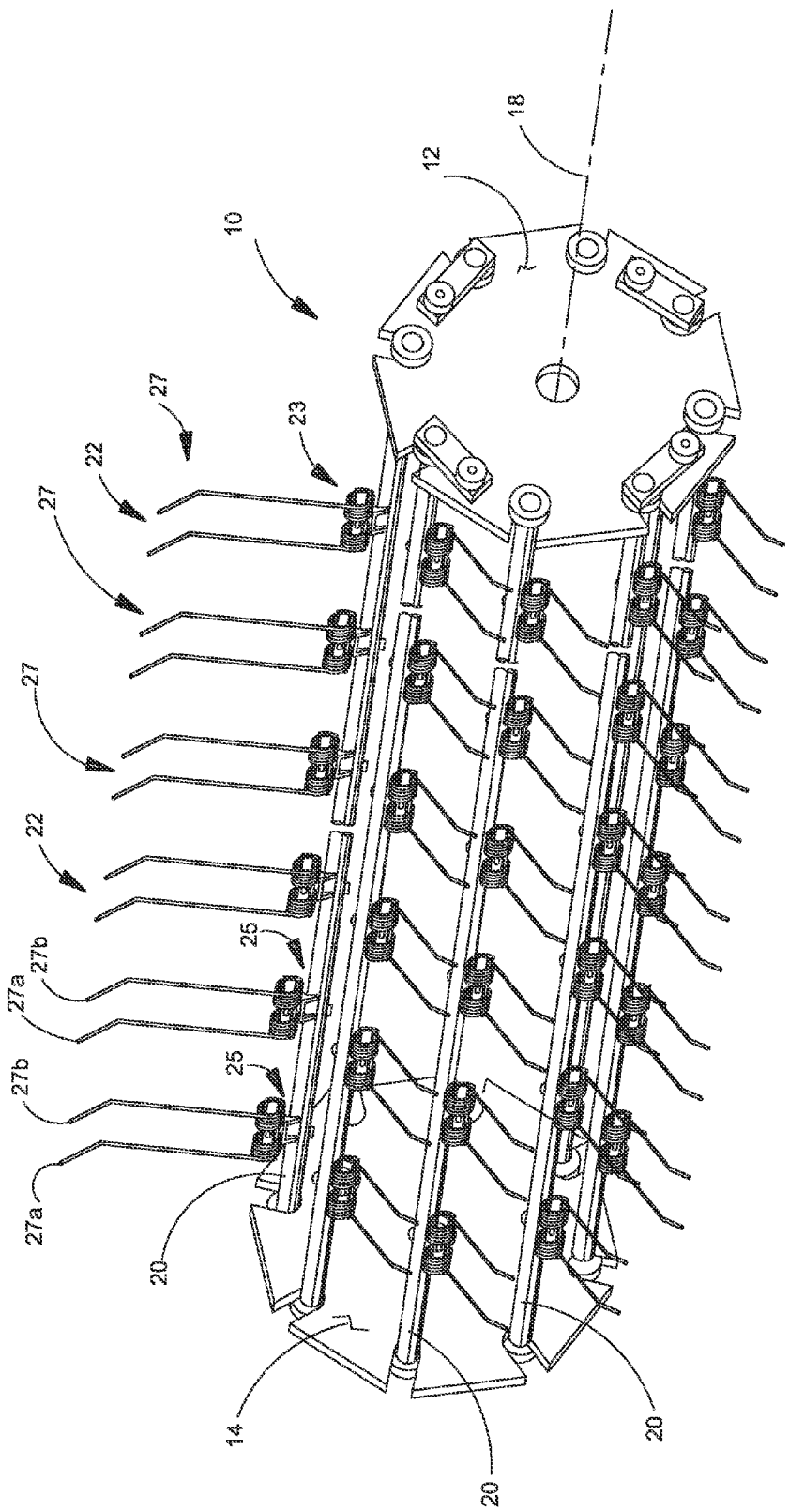
FIG. 1 is a partial perspective view of a tine reel for an agricultural pick-up assembly of the type on which the present invention is useful.

Many of the fastening, connection, processes and other means and components utilized in this invention are widely known and used in the field of the invention described, and their exact nature or type is not necessary for an understanding and use of the invention by a person skilled in the art, and they will not therefore be discussed in significant detail. Also, any reference herein to the terms "left" or "right" are used as a matter of mere convenience, and are determined by standing at the rear of the machine facing in its normal direction of travel. Likewise, "forward" and "rearward" are determined by the normal direction of travel. "Upward" and "downward" orientations are relative to the ground or operating surface as are any references to "horizontal" or "vertical" planes. Furthermore, the various components shown or described herein for any specific application of this invention can be varied or altered as anticipated by this invention and the practice of a specific application of any element may already be widely known or used in the art by persons skilled in the art and each will likewise not therefore be discussed in significant detail. When referring to the figures, like parts are numbered the same in all of the figures.

Referring to the figures and FIG. 1 in particular, a pick-up tine reel 10 for an agricultural machine, such as a baler, is shown comprising a pair of spaced-apart end plates 12, 14 configured for rotation about a generally horizontal rotational axis 18, to which are connected a plurality of transverse tine bars 20 spanning between the end plates. The tine bars 20 are radially distanced from the rotational axis 18 and distributed around a rotational circumference of the tine reel 10. The end plates 12, 14 are rotated by conventional drive means within the machine, such as chains and sprockets (not shown), thereby moving the tine bars 20 in an orbital path about the rotational axis 18. A plurality of tines 22 connected to each of the tine bars 20 and extending generally radially therefrom is arranged to lift crop material from the ground as the tine reel 10 is rotated and direct such crop material into the machine for processing. The tine bars 20 may further be individually rotated about their longitudinal axes by mechanisms in the tine reel 10 in order to vary the degree of outward tine extension from the tine reel.

As the tine reel 10 is rotated the plurality of tines 22 is subjected to primarily longitudinal fore-aft forces as the crop material is engaged and lifted from the ground. It is known to provide a spring 23 disposed between each tine mount 25 and the tine finger 27 to allow the tine to flex without damaging the tine, tine bar, or drive elements in the tine reel. It is common for each tine 27 to include a pair of tine fingers 27a, 27b sharing a single tine mount 25 to improve assembly efficiency.

Referring to FIGS. 2 through 4, details of each tine 22 connection to the tine bar 20 are shown using tine mount 25. Each tine mount 25 includes a mounting bracket 31 which is connected to the tine bar 20 by a connector 32, 32a, such as a bolt and nut. In the preferred embodiment shown, each tine 22 includes a mounting loop 21 from which extend first and second tine fingers 27a, 27b to reduce the number of tine mounts 25 necessary for a given number of tine fingers on the reel. Springs 23a, 23b are provided on each tine finger 27a, 27b to allow the tine fingers 27a, 27b to move relative to the tine mount 25 without damaging the tine, tine mount, or tine bar. Springs 23a, 23b are helically coiled from the wire forming the tine about an axis 100 generally parallel to the tine bar when the tines are operably mounted and spaced apart by the mounting loop 21 a distance sufficient for the mounting bracket 31 to fit between the springs 23a, 23b. Multiple turns of the coils wound in adjacent contact (close-wound spring) typically provide the require spring flexibility for the tine. Each tine is preferably shaped from a single length of solid wire. A portion of the inward face of each spring coil is in adjacent contact with respective side faces 39a, 39b of the mounting bracket 31.

Each tine 22 is held in position in the mounting bracket 31 by a mounting clamp 33 held in position on the tine bar by a single, shared connector 32, 32a for ease of assembly and tine replacement. Mounting clamp 33 comprises a contoured clamping surface 35 which matches an interfacing contour in the mounting bracket 31 to clamp the tine 22 in a fixed position therebetween. Mounting clamp 33 also includes a pair of opposing flanges 37, 378 disposed on the outboard ends of the clamp. Flanges 37, 38 are positioned in adjacent contact with the outward face of each spring coil when operably assembled.

Flanges 37, 38 extend circumferentially around each spring 23a, 23b, when operably assembled, between a first end 37a, 38a and a second end 37b, 38b, respectively. The degree of spring circumferential coverage by flanges 37, 38 is maximized to inhibit lateral movement of the tine fingers (shown in FIG. 2 as movement direction arrows "A" and "B") while maintaining the circumferential distance between the first 37a, 38a and second ends 37b, 38b small enough to enable the mounting clamp 33 to be inserted through the interior of the spring coils 23a, 23b. As shown in FIG. 2, movement of the tine finger 27a in the "A" direction causes the portion of spring coil 23a adjacent to flange end 37a to move outwardly away from the tine bracket face 39a. Flange end 37a is positioned to inhibit spring coil movement in the direction. Similarly, movement of the tine finger 27a in the "B" direction causes the portion of spring coil 23a adjacent to flange end 37b to move outwardly away from the tine bracket face 39a. Flange end 37b is positioned to inhibit spring coil movement in the direction. The combination of the flanges 37, 38 and the mounting bracket side faces 39a, 39b laterally restrain a portion of the spring coils 23a, 23b so that the springs are inhibited from extending in a direction parallel to the tine bar (and coil) axis 100. Laterally restraining the spring coils reduces the degree of lateral deflection of the tine fingers 27 in both lateral directions, effectively stiffening the tine spring in the lateral direction without affecting the spring rate in the longitudinal (tine finger rotation about the spring coil axis) direction.

Naturally, the invention is not limited to the foregoing embodiments, but it can also be modified in many ways without departing from the basic concepts. It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

Having thus described the invention, what is claimed is:

1. An improved pick-up tine reel for an agricultural machine comprising:

first and second spaced apart and generally opposing end plates arranged for rotation about a common, laterally aligned axis;

a tine bar spanning between said first and second end plates for rotation therewith to define a generally cylindrical rotational path;

a plurality of tines connected to said tine bar, each tine having a mounting loop for attachment to said tine bar and a tine finger and a spring coil disposed on opposing sides of the mounting loop, each said spring coil being coiled about an axis generally parallel to said common axis; and a tine mounting bracket for connecting each of said plurality of tines to said tine bar, said mounting bracket comprising a first portion configured to matingly engage and clamp said mounting loop in a fixed position therebetween, said first portion having a first side surface oriented for adjacent contact with a first side of each said spring coil and second portions extending generally perpendicular to the first portion and each having a restraining surface oriented for adjacent contact with a second side of each said spring coil wherein movement of each said tine finger is laterally inhibited in both first and second opposing direction by contact between the second side of each coil and the restraining surface.

2. The pick-up reel of claim 1, wherein each said second portion extends from each said first portion in a direction of a tine mount.

3. The pick-up reel of claim 2, wherein each said spring coil is a helically wound coil having a circumference and each said restraining surface is in adjacent contact with each said second side extends partially around said circumference and the dimensions of each said second side is less than the interior of each said helically wound coil.

4. The pick-up reel of claim 3, wherein each said first portion and each said second portion are connected to said tine bar by a shared fastener.

5. The pick-up reel of claim 4, wherein said first portion further having a second side surface and being arranged to fit between and in adjacent contact with inward-facing surfaces of said first and said second spring coils.

6. A connector for removably attaching a tine to an elongate tine bar in a tine reel used on an agricultural machine, said connector comprising:
   a tine having a mounting loop for attachment to said tine bar and a first and second tine finger and a first and second spring coil, the first tine finger and first spring coil disposed on an opposing side of the mounting loop from the second tine finger and second spring coil, each said spring coil being coiled about an axis generally parallel to said tine bar; and
   a tine mounting bracket for connecting said tine to said tine bar, said mounting bracket comprising a first portion and second portions configured to matingly engage and clamp said mounting loop in a fixed position therebetween, said first portion having a first side surface oriented for adjacent contact with a first side of each said spring coil, each said second portion having a respective inward facing restraining surface oriented for adjacent contact with a second outward side of each said coil spring generally perpendicular to each first side wherein movement of each said spring coil is laterally inhibited reducing the degree of lateral deflection of the tine fingers in both first and second opposing lateral directions by contact between the second side of the coil and the respective restraining surface.

7. The connector of claim 6, wherein said second portion extends from the first portion in a direction of the tine mount.

8. The connector of claim 7, wherein each said spring coil is a helically wound coil having a circumference and each said restraining surface in adjacent contact with each said second side extends partially around said circumference yet allowing each said second side to be passed through the interior of said helically wound coil.

9. The connector of claim 8, wherein each said first portion and each said second portion are connected to said tine bar by a shared fastener.

10. The connector of claim 9, wherein said first portion further having a second side surface and being arranged to fit between and in adjacent contact with inward-facing surfaces of said first and said second spring coils.

11. A connector for removably attaching a tine to an elongate tine bar in a tine reel on an agricultural machine, said connector comprising:
   a tine having a centrally disposed mounting loop with generally opposing first and second ends defining an interior width therebetween, first and second generally helically wound spring coils, one spring coil extending from each said end, and each wound around a common axis, and a pair of tine fingers extending from each spring coil generally radially from said common axis;
   a tine bar bracket generally having a receptacle configured to receive a portion of said mounting loop disposed between generally parallel and spaced-apart first and second side surfaces, said side surfaces being arranged to fit between and in adjacent contact with inward-facing surfaces of said first and said second spring coils;
   a tine clamp bracket having generally facing first and second restraining surfaces oriented for adjacent contact with outward-facing surfaces of said first and said second spring coils; and
   a fastener fixing said tine bar bracket and said tine clamp to said tine bar with said mounting loop clamped in said receptacle by said tine clamp, said first and second side surfaces and said first and second restraining surfaces inhibiting lateral movement of said spring coils wherein said first and second restraining surfaces extend outwardly from a central portion of the tine clamp both forward and rearward of the fastener with respect to the direction of extension of the tine.

12. The connector of claim 11, wherein each said spring coil defines a circumference and each said restraining surface adjacent contact with said second side of said spring coil extends partially around said circumference and allowing each said second side to be passed through the interior of each said helically wound coil.

13. The connector of claim 12, wherein said mounting loop, each said spring coil, and each said tine finger are formed from a continuous elongate member.

\* \* \* \* \*